US012545550B2

(12) United States Patent
Koskinen et al.

(10) Patent No.: US 12,545,550 B2
(45) Date of Patent: Feb. 10, 2026

(54) ELEVATOR PARKING BRAKE, A METHOD FOR OPERATING AN ELEVATOR SYSTEM AND AN ELEVATOR SYSTEM

(71) Applicant: Kone Corporation, Helsinki (FI)

(72) Inventors: Antti Koskinen, Helsinki (FI); Petri Hartikainen, Helsinki (FI); Pekka Hallikainen, Helsinki (FI); Janne Salomaki, Helsinki (FI); Antti Saarelainen, Helsinki (FI); Henri Wenlin, Helsinki (FI); Risto Jokinen, Helsinki (FI); Timo Vlasov, Helsinki (FI); Mikko Puranen, Helsinki (FI); Esa Putkinen, Helsinki (FI); Jyrki Laaksonheimo, Helsinki (FI); Lauri Stolt, Helsinki (FI); Tuukka Kauppinen, Helsinki (FI); Jarkko Saloranta, Helsinki (FI); Hilkka Hamalainen, Helsinki (FI); Sami Saarela, Helsinki (FI)

(73) Assignee: Kone Corporation, Helsinki (FI)

( * ) Notice: Subject to any disclaimer, the term of this patent is extended or adjusted under 35 U.S.C. 154(b) by 1457 days.

(21) Appl. No.: 17/071,305

(22) Filed: Oct. 15, 2020

(65) Prior Publication Data

US 2021/0139275 A1    May 13, 2021

(30) Foreign Application Priority Data

Nov. 12, 2019 (EP) .................................... 19208552

(51) Int. Cl.

*B66B 1/44* (2006.01)
*B66B 1/26* (2006.01)
*B66B 11/02* (2006.01)

(52) U.S. Cl.

CPC .................. *B66B 1/44* (2013.01); *B66B 1/26* (2013.01); *B66B 11/02* (2013.01)

(58) Field of Classification Search

CPC .. B66B 1/44; B66B 1/26; B66B 11/02; B66B 1/3476; B66B 5/18; B66B 5/0037;

(Continued)

(56) References Cited

U.S. PATENT DOCUMENTS

| | | | | |
|---|---|---|---|---|
| 6,483,047 | B1 | 11/2002 | Zaharia et al. | |
| 8,157,061 | B2 * | 4/2012 | Gremaud .................. | B66B 5/16 188/166 |
| 2020/0002122 | A1 * | 1/2020 | Koskinen .................. | B66B 9/00 |

FOREIGN PATENT DOCUMENTS

| | | | |
|---|---|---|---|
| CH | 707833 | A1 | 9/2014 |
| EP | 3388380 | A1 | 10/2018 |

OTHER PUBLICATIONS

Chinese Office Action dated Jan. 27, 2025 issued in corresponding Chinese Patent Appln. No. 202011246519.X.

(Continued)

*Primary Examiner* — Jeffrey Donels

(74) *Attorney, Agent, or Firm* — Harness, Dickey & Pierce, P.L.C.

(57) ABSTRACT

According to an aspect, there is provided an elevator parking brake comprising brake pads configured to provide a braking force against a guide rail in a loading and unloading situation of an elevator car; and at least one sensor. The elevator parking brake is configured to allow a predetermined amount of movement within the elevator parking brake in the loading and unloading situation of the elevator car, and the at least one sensor is configured to provide at least one indication associated with the movement within the elevator parking brake in the loading and unloading situation of the elevator car.

19 Claims, 3 Drawing Sheets

(58) Field of Classification Search
CPC ........... B66B 1/36; B66B 7/10; B66B 11/006; B66B 11/0293
See application file for complete search history.

(56) References Cited

OTHER PUBLICATIONS

Extended European Search Report for European Application No. 19208552.0 dated Jun. 12, 2020.

* cited by examiner

ELEVATOR PARKING BRAKE, A METHOD FOR OPERATING AN ELEVATOR SYSTEM AND AN ELEVATOR SYSTEM

RELATED APPLICATIONS

This application claims priority to European Patent Application No. 19208552.0 filed on Nov. 12, 2019, the entire contents of which are incorporated herein by reference.

BACKGROUND

An elevator car needs to be kept within the door zone at a landing so that the car door sill and the landing door sill are on the same level for safe boarding and exit of passengers. Due to elasticity of suspension ropes, a load change in the elevator car and the resulting tension change in the suspension ropes may move the car and create a step between the car and landing posing a tripping hazard. Relevelling of the car can be performed by machinery in order to prevent such a tripping hazard. However, precision positioning of the car is a complex task and the dynamic load change during loading and unloading of the car makes the process difficult.

A parking brake solves the problem that is caused by the suspension elasticity during a loading and unloading situation of the elevator car. The parking brake holds the elevator car in its place during loading and unloading and releases its grip after the load has been transferred to the suspension ropes and the car and landing doors have been closed, before the elevator starts to run again. The rope tension should be adjusted to correspond with the changed load at the car so as to avoid an unpleasant jerk when the parking brake is released.

There is a need for an elevator parking brake solution that would avoid the unpleasant jerk when the parking brake is released.

SUMMARY

According to a first aspect, there is provided an elevator parking brake. The parking brake comprises brake pads configured to provide a braking force against a guide rail in a loading and unloading situation of an elevator car; and at least one sensor, wherein the elevator parking brake is configured to allow a predetermined amount of movement within the elevator parking brake in the loading and unloading situation of the elevator car and wherein the at least one sensor is configured to provide at least one indication associated with the movement within the elevator parking brake in the loading and unloading situation of the elevator car.

In an example embodiment, the elevator parking brake comprises a controller operatively connected to the at least one sensor.

In an example embodiment, the elevator parking brake comprises a first element comprising the brake pads, the first element comprising a first pivot point enabling the first element to pivot with respect to the guide rail; a second element connected to the first element; a third element connected to the second element via a second pivot point and configured to be attached to a sling, the second pivot point enabling the third element to pivot with respect to the second element, wherein the at least one sensor is arranged between the second element and the third element to detect movement of the third element with respect to the second element.

In an example embodiment, the elevator parking brake comprises a fourth element comprising the brake pads, the fourth element comprising a third pivot point enabling the fourth element to pivot with respect to the guide rail; a fifth element connected to the fourth element via a fourth pivot point and configured to be attached to a sling; a connecting element connected to the fourth element via a fifth pivot point; wherein the at least one sensor is arranged between the connecting element and an attachment member configured to be connected to the sling or the elevator car, to detect movement of the connecting element with respect to the attachment member.

In an example embodiment, the elevator parking brake is configured to allow the predetermined amount of vertical movement within a brake housing or bracket in the loading and unloading situation of the elevator car.

In an example embodiment, the at least one sensor is configured to provide the at least one indication when the predetermined amount of movement has been reached.

In an example embodiment, the at least one sensor comprises at least one of a switch, a micro switch, a pressure sensor, an optical sensor, a strain gauge, an acceleration sensor or a proximity sensor.

According to a second aspect, there is provided an elevator car comprising at least one elevator parking brake of the first aspect.

According to a third aspect, there is provided a method for operating an elevator system. The method comprises controlling at least one elevator parking brake of the first aspect associated with the elevator car to provide a braking force against a guide rail in a loading and/or unloading situation of an elevator car; during the loading and/or unloading situation, monitoring a state of the at least one sensor of the at least one elevator parking brake based on the at least one indication provided by the at least one sensor; analyzing the state; and controlling tension of suspension means associated with the elevator car based on the analysis.

In an embodiment, monitoring a state of the at least one sensor comprises monitoring a first indication from the at least one elevator parking brake, the first indication indicating that a predetermined amount of movement within the elevator parking brake has been reached during the unloading situation; and controlling tension of suspension means comprises loosening the suspension means until failing to subsequently detect the first indication from the at least one elevator parking brake.

In an example embodiment, monitoring a state of the at least one sensor comprises monitoring a second indication from the at least one elevator parking brake, the second indication indicating that the predetermined amount of movement within the elevator parking brake has been reached during the loading situation; and controlling tension of suspension means comprises tightening the suspension means until failing to subsequently detect the second indication from the at least one elevator parking brake.

In an example embodiment, the controlling comprises adjusting tension of the suspension means associated with the elevator car to alter a vibration amplitude and/or a frequency of the suspension means based on the analysis.

In an example embodiment, the at least one sensor comprises a single sensor, and the method further comprises failing to detect a change in the state of the sensor in the unloading situation; loosening the tension of the suspension means until detecting a change in the state of the sensor; and tightening the tension of the suspension means until detecting a subsequent change in the state of the sensor.

In an example embodiment, the at least one sensor comprises a single sensor, and the method further comprises failing to detect a change in the state of the sensor in the loading situation; tightening the tension of the suspension means until detecting a change in the state of the sensor; and loosening the tension of the suspension means until detecting a subsequent change in the state of the sensor.

According to a fourth aspect, there is provided an elevator system comprising an elevator car; at least one elevator parking brake of the first aspect associated with the elevator car; suspension means configured to support the elevator car in an elevator shaft; and a controller configured to control the at least one elevator parking brake to provide a braking force against a guide rail in a loading and/or unloading situation of an elevator car; during the loading and/or unloading situation, monitor a state of the at least one sensor of the at least one elevator parking brake based on the at least one indication provided by the at least one sensor; analyze the state; and control tension of the suspension means based on the analysis.

In an example embodiment, the controller is configured to monitor a first indication from the at least one elevator parking brake, the first indication indicating that a predetermined amount of movement within the elevator parking brake has been reached during the unloading situation; and loosen the suspension means until failing to subsequently detect the first indication from the at least one elevator parking brake.

In an example embodiment, the controller is configured to monitor a second indication from the at least one elevator parking brake, the second indication indicating that the predetermined amount of movement within the elevator parking brake has been reached during the loading situation; and tighten the suspension means until failing to subsequently detect the second indication from the at least one elevator parking brake.

In an example embodiment, the controller is configured to adjust tension of the suspension means associated with the elevator car to alter a vibration amplitude and/or a frequency of the suspension means based on the analysis.

In an example embodiment, the at least one sensor comprises a single sensor, and the controller is configured to fail to detect a change in the state of the sensor in the unloading situation; loosen the tension of the suspension means until detecting a change in the state of the sensor; and tighten the tension of the suspension means until detecting a subsequent change in the state of the sensor.

In an example embodiment, the at least one sensor comprises a single sensor, and the controller is configured to fail to detect a change in the state of the sensor in the loading situation; tighten the tension of the suspension means until detecting a change in the state of the sensor; and loosen the tension of the suspension means until detecting a subsequent change in the state of the sensor.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

According to various embodiments, an elevator parking brake is disclosed. The elevator parking brake comprises brake pads configured to provide a braking force against a guide rail in a loading and unloading situation of an elevator car, and at least one sensor. The elevator parking brake is configured to allow a predetermined amount of movement within the elevator parking brake in the loading and unloading situation of the elevator car; and the at least one sensor is configured to provide at least one indication associated with the movement within the elevator parking brake in the loading and unloading situation of the elevator car.

Figure 1A:
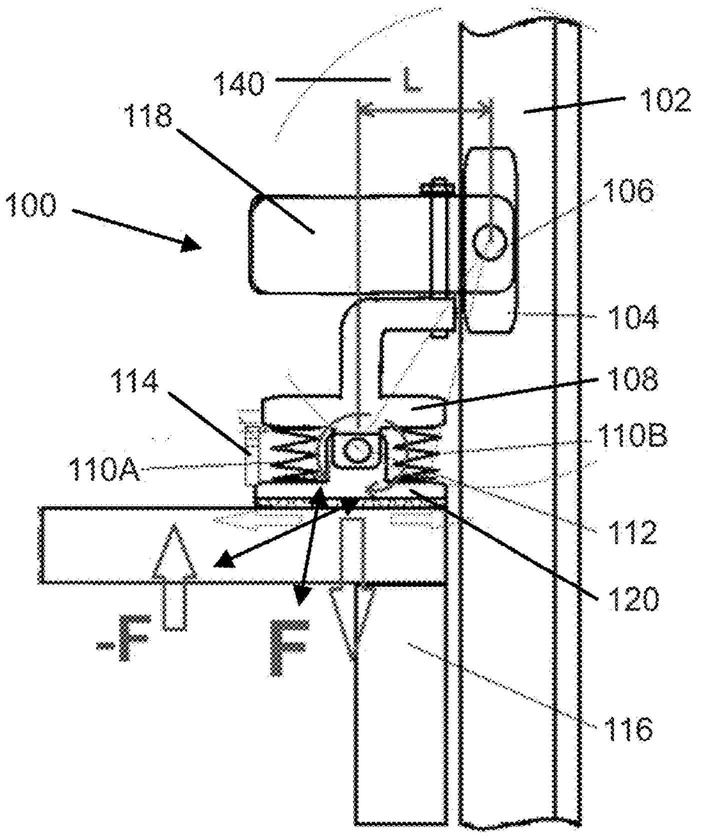
FIG. 1A illustrates an elevator parking brake according to an example embodiment.

FIG. 1A illustrates an elevator parking brake 100 according to an example embodiment. The elevator parking brake 100 holds an elevator car in its place during loading and unloading and releases its grip after the load has been transferred to suspension means—suspension ropes for example—and car and landing doors have been closed, before the elevator car starts to run again.

The elevator parking brake 100 comprises brake pads 104 configured to provide a braking force against a guide rail 102 in a loading and unloading situation of an elevator car. Although FIG. 1A illustrates only one brake pad, the elevator parking brake may include more than one brake pad. The elevator parking brake 100 is configured to allow a predetermined amount of movement within the elevator parking brake 100 in the loading and unloading situation of the elevator car. The movement may be enabled using elements 108, 118, 120 and pivot points 106, 112.

The elevator parking brake 100 comprises a first element 118 comprising the brake pads 104. The first element 118 comprises a first pivot point 106 enabling the first element 118 to pivot with respect to the guide rail 102. A second element 108 is connected to the first element 118 with, for example, a bolt or a pin. A third element 120 is connected to the second element 108 via a second pivot point 112. The third element 120 is configured to be attached to a sling 116. The second pivot point 112 enables the third element 120 to pivot with respect to the second element 108 in the loading and unloading situation of the elevator car. When the load of the elevator car increases (i.e. passengers step into the elevator car), the third element 120 pivots with respect to the second pivot point 112 in a counter-clockwise direction. Similarly, when the load of the elevator car decreases (i.e. passengers step out of the elevator car), the third element 120 pivots with respect to the second pivot point 112 in a clockwise direction. As the shape of the third element 120 is such that it enables a space to be formed between the second element 108 and the third element 120 at each side of the second pivot point 112, when the third element 120 rotates with respect to the second element 108, the distance or angle between the third element 120 and the second element 108 changes.

At least one sensor 114 is arranged between the second element 108 and the third element 120 to detect movement of the third element 120 with respect to the second element 108. In an example embodiment, only one sensor 114 is arranged between the second element 108 and the third element 120. In another example embodiment, separate sensors 114 may be arranged at each side of the second pivot point 112. The sensor 114 is configured to provide at least one indication associated with the movement in the loading and unloading situation of the elevator car. In an example embodiment, the at least one indication may be provided when the predetermined amount of movement, for example, 1-2 mm has been reached. In another example embodiment, the at least one indication may reflect the amount of movement. The indication may comprise a state signal, being for example 0 or 1 (binary signal), or the indication may comprise a numerical value reflecting the amount of movement. Further, providing an indication is to be understood broadly and it may also refer to an embodiment where the sensor does not send any signals, i.e. absence of signals from the sensor. Thus, absence of a signal from the sensor may also be understood as an "indication". Further, in an example embodiment, the sensor 114 is a switch, a micro switch, a pressure sensor, an optical sensor, a strain gauge, an acceleration sensor or a proximity sensor (optical or magnetic). In case an acceleration sensor is used, based on the values provided by the acceleration sensor, it may be determined whether the elevator car is suspending by the suspension means or whether the predetermined amount of movement within the elevator parking brake 136 has been reached.

Further, in an example embodiment, load springs 110A, 110B may be arranged between the second element 108 and the third element 120, as illustrated in FIG. 1A. The load springs 110A, 110B may be configured to center the elevator parking brake 100. When the parking brake is in a released state, the load springs 110A, 110B position the second element 108 with respect to the pivot point 112.

In an example embodiment, the elevator parking brake 100 may comprise a controller operatively connected to the at least one sensor 114.

As a summary of the solution illustrated in FIG. 1A, the solution is based on the torque in the elevator parking brake 100 due the distance 140 between the two pivot points 106 and 112 and the vertical force exerted to the elevator parking brake 100. The illustrated solution avoids the unpleasant jerk when the elevator parking brake is released as the tension of the suspension means has been matched with the changed load in the elevator car.

Figure 1B:
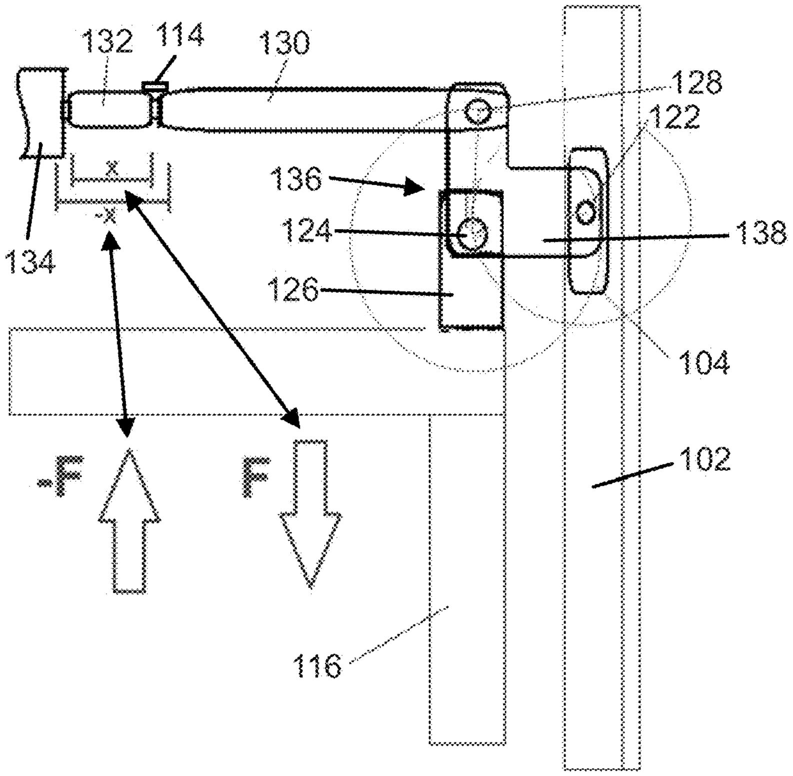
FIG. 1B illustrates an elevator parking brake according to another example embodiment.

FIG. 1B illustrates an elevator parking brake 136 according to another example embodiment. The elevator parking brake 136 holds the elevator car in its place during loading and unloading and releases its grip after the load has been transferred to suspension means—suspension ropes for example—and car and landing doors have been closed, before the elevator car starts to run again.

The elevator parking brake 136 comprises brake pads 104 configured to provide a braking force against a guide rail 102 in a loading and unloading situation of the elevator car. Although FIG. 1B illustrates only one brake pad, the elevator parking brake may include more than one brake pad. The elevator parking brake 136 is configured to allow a predetermined amount of movement within the elevator parking brake 136 in the loading and unloading situation of the elevator car. The movement may be enabled using elements 126, 138, 130 and pivot points 122, 124, 128.

The elevator parking brake 136 comprises a fourth element 138 comprising the brake pads 104. The fourth element 138 comprises a third pivot point 122 enabling the fourth element 138 to pivot with respect to the guide rail 102. The elevator parking brake 136 further comprises a fifth element 126 connected to the fourth element 138 via a fourth pivot point 124 and configured to be attached to a sling 116. The elevator parking brake 136 further comprises a connecting element 130 connected to the fourth element 138 via a fifth pivot point 128. The elevator parking brake 136 may be connected to the sling 116 or to the elevator car with an attachment member 134.

Further, the at least one sensor 114 is arranged between the connecting element 130 and the attachment member 134 to detect movement of the connecting element 130 with respect to the attachment member 134. Depending on the direction of rotation of the fourth element 138, the connecting element 130 moves either to the right (the load decreases in the elevator car) or to the left (the load increases in the elevator car). In an example embodiment, a centering spring 132 may arranged between the attachment member 134 and the connecting element 130. The centering spring 132 may be configured to center the mechanical parts when the elevator parking brake 136 is in a released state. In another example embodiment, the connecting element 130 itself may allow compression and decompression and the at least one sensor 114 arranged between the attachment member 134 and the connecting element 130 is configured to detect movement of the connecting element 130 with respect to the attachment member 134. At some point during the compression or decompression, the distance between the connecting element 130 and the attachment member 134 has changed enough to trigger the indication with the at last one sensor 114. In an example embodiment, the at least one indication may be provided when the predetermined amount of movement has been reached. In another example embodiment, the at least one indication may reflect the amount of movement. The indication may comprise a state signal, being for example 0 or 1 (binary signal), or the indication may comprise a numerical value reflecting the amount of movement. Further, providing an indication is to be understood broadly and it may also refer to an embodiment where the sensor does not send any signals, i.e. absence of signals from the sensor. Thus, absence of a signal from the sensor may also be understood as an "indication". Further, in an example embodiment, the sensor 114 is a switch, a micro switch, a pressure sensor, an optical sensor, a strain gauge, an acceleration sensor or a proximity sensor (optical or magnetic). In case an acceleration sensor is used, based on the values provided by the acceleration sensor, it may be determined whether the elevator car is suspending by the suspension means or whether the predetermined amount of movement within the elevator parking brake 136 has been reached.

In an example embodiment, the elevator parking brake 136 may comprise a controller operatively connected to the at least one sensor.

As a summary of the solution illustrated in FIG. 1B, the solution is based on the torque in the elevator parking brake 136 due the distance between the brake pad 104 gripping point and the sling fixing point when the elevator parking brake 136 is applied and the load inside the elevator car is changing. The illustrated solution avoids the unpleasant jerk when the elevator parking brake is released as the tension of the suspension means has been matched with the changed load in the elevator car.

Figure 1C:
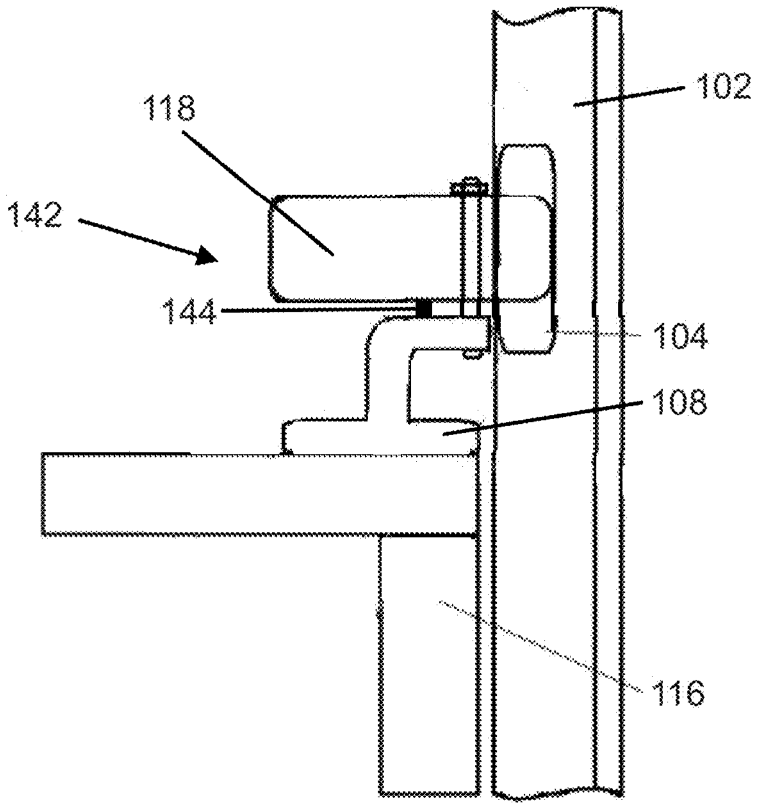
FIG. 1C illustrates an elevator parking brake according to another example embodiment.

FIG. 1C illustrates an elevator parking brake 142 according to an example embodiment. The elevator parking brake 142 holds an elevator car in its place during loading and unloading and releases its grip after the load has been transferred to suspension means—suspension ropes for example—and car and landing doors have been closed, before the elevator car starts to run again.

The elevator parking brake 142 comprises brake pads 104 configured to provide a braking force against a guide rail 102 in a loading and unloading situation of an elevator car. Although FIG. 1C illustrates only one brake pad, the elevator parking brake may include more than one brake pad. The elevator parking brake 142 is configured to allow a predetermined amount of movement within the elevator parking brake 142 in the loading and unloading situation of the elevator car. The movement may be enabled using elements 108 and 118.

The elevator parking brake 142 comprises a first element 118 comprising the brake pads 104. A second element 108 is connected to the first element 118 with a connection arrangement, for example, a bolt or a pin. The second element 108 is further configured to be attached to a sling 116.

When the load of the elevator car increases (i.e. passengers step into the elevator car), the connection arrangement between the first element 118 and the second element 108 enables the second element 108 to move vertically away from the first element 118. Similarly, when the load of the elevator car decreases (i.e. passengers step out of the elevator car), the connection arrangement between the first element 118 and the second element 108 enables the second element 108 to move vertically towards the first element 118.

At least one sensor 144 may be arranged between the first element 118 and the second element 108 to detect movement of the first element 118 with respect to the second element 108. In an example embodiment, one sensor may be configured to detect movement in the up direction and another sensor may be configured to detect movement in the down direction. In another example embodiment, only a single sensor may be used to detect movement in the up direction or the down direction. The sensor 144 is configured to provide at least one indication associated with the movement of the second element 108 with respect to the first element 118 in the loading and unloading situation of the elevator car. In an example embodiment, the at least one indication may be provided when the predetermined amount of movement, for example, 1-2 mm has been reached. In another example embodiment, the at least one indication may reflect the amount of movement. The indication may comprise a state signal, being for example 0 or 1 (binary signal), or the indication may comprise a numerical value reflecting the amount of movement. Further, providing an indication is to be understood broadly and it may also refer to an embodiment where the sensor does not send any signals, i.e. absence of signals from the sensor. Thus, absence of a signal from the sensor may also be understood as an “indication”. Further, in an example embodiment, the sensor 144 is a switch, a micro switch, a pressure sensor, an optical sensor, a strain gauge, an acceleration sensor or a proximity sensor (optical or magnetic). In case an acceleration sensor is used, based on the values provided by the acceleration sensor, it may be determined whether the elevator car is suspending by the suspension means or whether the predetermined amount of movement within the elevator parking brake 142 has been reached.

As a summary of the solution illustrated in FIG. 1C, the elevator parking brake 142 may be configured to allow a predetermined amount of vertical movement within the brake housing or bracket in the loading and unloading situation of the elevator car, and at least one sensor 144 may be arranged to detect the vertical movement.

In an example embodiment, the elevator parking brake 142 may comprise a controller operatively connected to the at least one sensor 144.

Figure 2:
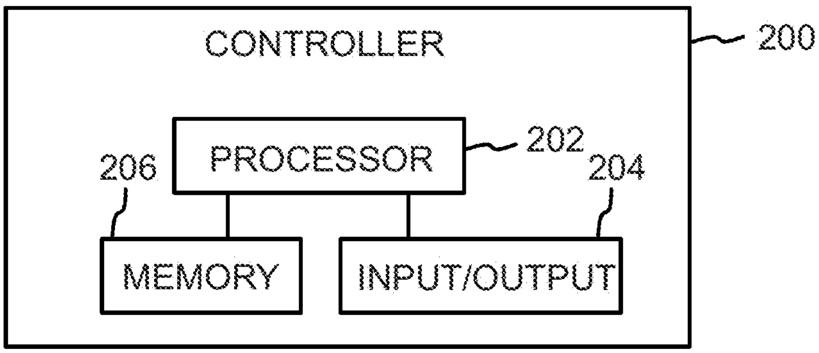
FIG. 2 illustrates a controller for operating an elevator system according to an example embodiment.
Figure 3:
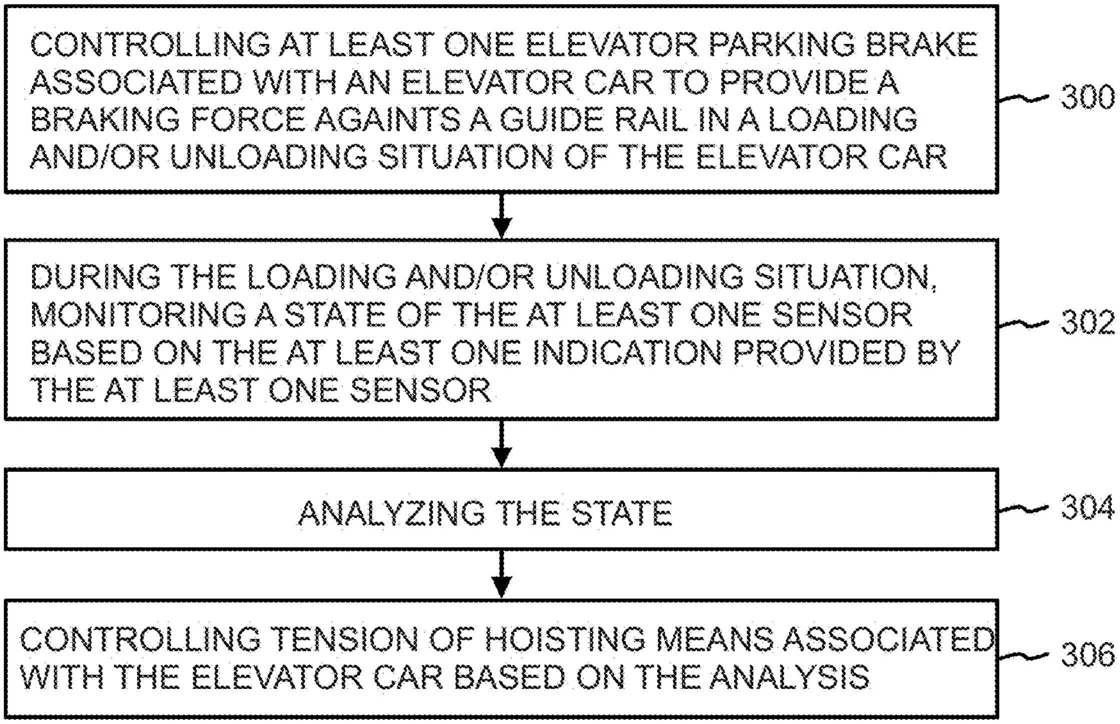
FIG. 3 that illustrates a method for operating an elevator system according to an example embodiment.
Figure 4:
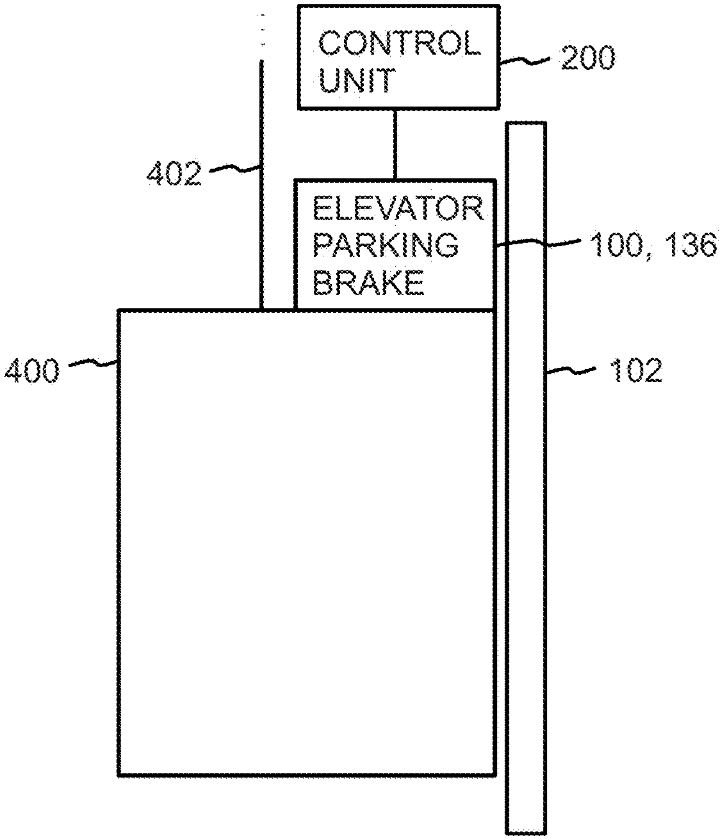
FIG. 4 illustrates an elevator system according to an embodiment.

FIG. 2 illustrates a controller 200 for operating an elevator system according to an example embodiment. FIG. 2 is discussed together with FIG. 3 that illustrates a method for operating an elevator system according to an example embodiment and FIG. 4 that illustrates the elevator system according to an example embodiment.

The method comprises controlling 300 at least one elevator parking brake 100, 136 associated with an elevator car 400 to provide a braking force against a guide rail in a loading and/or unloading situation of an elevator car 400.

At 302, during the loading and/or unloading situation, the controller 200 is configured to monitor a state of the at least one sensor of the at least one elevator parking brake 100, 136 based on the at least one indication provided by the at least one sensor. Further, providing an indication is to be understood broadly and it may also refer to an embodiment where the sensor does not send any signals, i.e. absence of signals from the sensor. Thus, absence of a signal from the sensor may also be understood as an “indication”.

At 304, the controller 200 is configured to analyze the state.

At 306, the controller 200 is configured to control tension of suspension means associated with the elevator car 400 based on the analysis.

In an example embodiment, the controller 200 is configured to monitor at step 302 an indication from the at least one elevator parking brake 100, 136. The indication may indicate that a predetermined amount of movement within the elevator parking brake 100, 136 has been reached during an unloading situation. The controller 200 then is configured to control the tension of the suspension means 402 to change until the indication from the at least one elevator parking brake 100, 136 changes to indicate that the load of the elevator car corresponds to the tension of the suspension means.

In another example embodiment, the controller 200 is configured to monitor at step 302 an indication from the at least one elevator parking brake 100, 136. The indication may indicate that a predetermined amount of movement within the elevator parking brake 100, 136 has been reached during a loading situation. The controller 200 then is configured to control tension of the suspension means 402 to tighten the suspension means 402 until failing to subsequently receive the indication from the at least one elevator parking brake 100, 136.

In another example embodiment, one sensor is used to indicate with its state equilibrium between the elevator parking brake 100, 136 and the tension provided with the suspension means 402. The controller 200 may be configured to monitor at step 302 the state of the indication from the sensor. When using only one sensor, the sensor may, for example, only detect that the load in the elevator car is greater than the tension of the suspension means 402. When the load in the elevator car is less than the tension of the suspension means 402, the sensor may not provide any indication to the controller 200. This means that the state of the sensor does not change when the load in the elevator car reduces (i.e. in an unloading situation). The controller 200 may be configured to loosen the tension of the suspension means 402 with an amount that causes a change in the state of the sensor. When the state changes, it means that, due to the reduced tension from the suspension means 402, the elevator parking brake 100, 136 now carries some of the load of the elevator car. In response to detecting the state change of the sensor, the controller 200 may be configured to tighten the tension of the suspension means 402 with an amount that cause the state of the indication of the sensor to change again, i.e. to the state when no indication is received from the sensor. This means that the suspension means 402 again completely suspends the weight of the elevator car.

In another example embodiment, one sensor is used to indicate with its state equilibrium between the elevator parking brake 100, 136 and the tension provided with the suspension means 402. The controller 200 may be configured to monitor at step 302 the state of the indication from the sensor. When using only one sensor, the sensor may, for example, only detect that the load in the elevator car is less than the tension of the suspension means 402. When the load in the elevator car is greater than the tension of the suspension means 402, the sensor may not provide any indication to the controller 200. This means that the state of the sensor does not change when the load in the elevator car increases (i.e. in a loading situation). The controller 200 may be configured to tighten the tension of the suspension means 402 with an amount that causes a change in the state of the sensor. When the state changes, it means that the increased tension of the suspension means 402 now corresponds to a load that is greater than that of the elevator car. In response to detecting the state change of the sensor, the controller 200 may be configured to loosen the tension of the suspension means 402 with an amount that causes the state of the indication of the sensor to change again, i.e. to the state when no indication is received from the sensor. This means that the suspension means 402 again completely suspend the weight of the elevator car.

In another example embodiment, the controller 200 may be configured to adjust the tension of the suspension means 402 to alter a vibration amplitude and/or a frequency of sway in the suspension means 402 based on the analysis. The suspension means 402 associated with the elevator car 400 can be considered as freely vibrating "strings". These strings are excited into vibration, for example, by the movements of the elevator car 400 while loading/unloading and during traveling, building sway, accelerations caused by the motor. The swaying problem of the suspension means increases when the maximum travel distance of the elevator increases as it increases the length of the vibrating elements. In the worst case, the sway can have so high amplitude that the suspension means 402 touch walls of an elevator shaft or components fixed to the elevator shaft walls. During the sway, for example, metallic round ropes may also bang against each other, thus creating noise and causing minor additional wear. As elevator car moves up in the elevator shaft, the length of the suspension means from the elevator car to a motor decreases. The decreased suspension means length increases the rope swaying frequency and the vibrational energy stored in the suspension means can also increase due to the elevator car and building movement, i.e. energy is transferred from building movement to suspension means movement. By a dynamic adjustment of the tension in the suspension means 402, the vibration amplitude and/or frequency of the swaying suspension means 402 can be altered. This allows to get out of the resonance frequency of the suspension means 402 and thus effectively preventing the excessive suspension means sway build up during loading/unloading of the elevator car 400.

With the at least one elevator parking brake 100, 136 engaged, the sway of the suspension means 402 can be detected as the dynamic rope tension changes the same way as the change in the car load, i.e. the movement within the parking brake mechanism as described in the above.

Further, the controller 200 may also be configured to modify the tension of the suspension means 402 actively. Based on sway detection information, the controller 200 may be configured to actively adjust the tension of the suspension means 402. For example, when the tension at the suspension means 402 peaks, i.e. they are at the furthest away from their normal (straight) position, the tension is reduced, and when suspension means 402 have swayed into the normal (straight) position and are about to continue to the opposite side, the tension may be tightened.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. An elevator parking brake comprising:

brake pads configured to provide a braking force against a guide rail in a loading situation and an unloading situation of an elevator car;

at least one sensor, wherein the elevator parking brake is configured to allow a first amount of movement within the elevator parking brake in the loading situation and the unloading situation of the elevator car, and wherein the at least one sensor is configured to provide at least one indication associated with the movement within the elevator parking brake in the loading situation and the unloading situation of the elevator car; and a first element comprising the brake pads, wherein the first element includes a first pivot point enabling the first element to pivot with respect to the guide rail.

2. The elevator parking brake of claim 1, further comprising:

a second element connected to the first element; and a third element connected to the second element via a second pivot point and configured to attach to a sling, the second pivot point enabling the third element to pivot with respect to the second element;

wherein the at least one sensor is between the second element and the third element, and the at least one sensor is configured to detect a movement of the third element with respect to the second element.

3. The elevator parking brake of claim 1, comprising:

a second element connected to the first element via a second pivot point and configured to attach to a sling; and a connecting element connected to the first element via a third pivot point, wherein the at least one sensor is between the connecting element and an attachment member configured to connect to the sling or the elevator car and configured to detect a movement of the connecting element with respect to the attachment member.

4. The elevator parking brake of claim 1, wherein the elevator parking brake is configured to allow the first amount of vertical movement within a brake housing or bracket in the loading situation and the unloading situation of the elevator car.

5. The elevator parking brake of claim 1, wherein the at least one sensor is configured to provide the at least one indication when the first amount of movement has been reached.

6. The elevator parking brake of claim 1, wherein the at least one sensor comprises at least one of a switch, a micro switch, a pressure sensor, an optical sensor, a strain gauge, an acceleration sensor or a proximity sensor.

7. An elevator car comprising at least one elevator parking brake of claim 1.

8. A method for operating an elevator system, the method comprising:

controlling at least one elevator parking brake of claim 1 associated with the elevator car to provide the braking force against the guide rail in the loading situation and/or the unloading situation of the elevator car;

during the loading situation and/or the unloading situation, monitoring a state of the at least one sensor of the at least one elevator parking brake based on the at least one indication provided by the at least one sensor;

analyzing the state to obtain an analysis of the state; and controlling tension of suspension means associated with the elevator car based on the analysis of the state.

9. The method of claim 8, wherein:

monitoring the state of the at least one sensor comprises monitoring a first indication from the at least one elevator parking brake, the first indication indicating that the first amount of movement within the elevator parking brake has been reached during the unloading situation; and controlling the tension of the suspension means comprises loosening the suspension means until the analysis of the state of the at least one sensor indicates that a load of the elevator car is carried by the suspension means and not by the elevator parking brake.

10. The method of claim 8, wherein:

monitoring the state of the at least one sensor comprises monitoring a second indication from the at least one elevator parking brake, the second indication indicating that the first amount of movement within the elevator parking brake has been reached during the loading situation; and controlling the tension of the suspension means comprises tightening the suspension means until the analysis of the state of the at least one sensor indicates that a load of the elevator car is carried by the suspension means and not by the elevator parking brake.

11. The method of claim 8, wherein the controlling the tension comprises adjusting the tension of the suspension means associated with the elevator car to alter a vibration amplitude and/or a frequency of the suspension means based on the analysis of the state.

12. The method of claim 8, wherein the at least one sensor comprises a single sensor, and the method further comprises:

failing to detect a change in the state of the single sensor in the unloading situation;

loosening the tension of the suspension means until detecting a change in the state of the single sensor; and tightening the tension of the suspension means until detecting a subsequent change in the state of the single sensor.

13. The method of claim 8, wherein the at least one sensor comprises a single sensor, and the method further comprises:

failing to detect a change in the state of the single sensor in the loading situation;

tightening the tension of the suspension means until detecting a change in the state of the single sensor; and loosening the tension of the suspension means until detecting a subsequent change in the state of the single sensor.

14. An elevator system comprising:

an elevator car;

at least one elevator parking brake of claim 1 associated with the elevator car;

suspension means configured to support the elevator car in an elevator shaft; and a controller configured to:

control the at least one elevator parking brake to provide the braking force against the guide rail in the loading situation and/or the unloading situation of the elevator car;

during the loading situation and/or the unloading situation, monitoring a state of the at least one sensor of the at least one elevator parking brake based on the at least one indication provided by the at least one sensor;

analyze the state to obtain an analysis of the state; and control tension of the suspension means based on the analysis of the state.

15. The elevator system of claim 14, wherein the controller is configured to:

monitor a first indication from the at least one elevator parking brake, the first indication indicating that the first amount of movement within the elevator parking brake has been reached during the unloading situation; and loosen the suspension means until the analysis of the state of the at least one sensor indicates that a load of the elevator car is carried by the suspension means and not by the elevator parking brake.

16. The elevator system of claim 14, wherein the controller is configured to:

monitor a second indication from the at least one elevator parking brake, the second indication indicating that the first amount of movement within the elevator parking brake has been reached during the loading situation; and tighten the suspension means until the analysis of the state of the at least one sensor indicates that a load of the elevator car is carried by the suspension means and not by the elevator parking brake.

17. The elevator system of claim 14, wherein the controller is configured to adjust the tension of the suspension means associated with the elevator car to alter a vibration amplitude and/or a frequency of the suspension means based on the analysis of the state.

18. The elevator system of claim 14, wherein the at least one sensor comprises a single sensor, and the controller is configured to:

fail to detect a change in the state of the single sensor in the unloading situation;

loosen the tension of the suspension means until detecting a change in the state of the single sensor; and tighten the tension of the suspension means until detecting a subsequent change in the state of the single sensor.

19. The elevator system of claim 14, wherein the at least one sensor comprises a single sensor, and the controller is configured to:

fail to detect a change in the state of the single sensor in the loading situation;

tighten the tension of the suspension means until detecting a change in the state of the single sensor; and loosen the tension of the suspension means until detecting a subsequent change in the state of the single sensor.

* * * * *